(12) United States Patent
Smith et al.

(10) Patent No.: US 6,302,993 B1
(45) Date of Patent: *Oct. 16, 2001

(54) HAZARDOUS ENVIRONMENT PROTECTIVE GARMENTS HAVING A FUSION BONDED OPTICALLY TRANSPARENT FACEPIECE WITH OLEFIN TERPOLYMER SEAMS

(75) Inventors: W. Novis Smith; Joel McCloskey, both of Philadelphia, PA (US); Kelly Bradford, Cullman, AL (US)

(73) Assignee: LakeLand Industries, Ron Koukoma, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,475

(22) Filed: Oct. 1, 1998

(51) Int. Cl.[7] .................................................. C09J 5/10
(52) U.S. Cl. .................. 156/306.6; 156/108; 156/272.6; 156/308.4; 156/309.3; 156/309.6; 156/313
(58) Field of Search ................................ 156/93, 308.4, 156/309.6, 309.3, 306.6, 313, 108, 272.6, 275.1; 2/275, 457, 15, 427, 206, 904, 10, 9; 428/46

(56) References Cited

U.S. PATENT DOCUMENTS

| | | | | |
|---|---|---|---|---|
| H863 | * | 1/1991 | Kwiedorowicz | 2/424 |
| 3,201,374 | * | 8/1965 | Simms | 514/906 |
| 3,215,678 | * | 11/1965 | Adelman | 525/163 |
| 3,676,289 | * | 7/1972 | Hara et al. | 161/189 |
| 4,141,774 | * | 2/1979 | Ando et al. | 156/309 |
| 4,272,851 | * | 6/1981 | Goldstein | 2/275 |
| 4,410,575 | * | 10/1983 | Obayashi et al. | 428/57 |
| 5,082,721 | * | 1/1992 | Smith | 2/81 |
| 5,491,022 | * | 2/1996 | Smith | 428/515 |
| 5,494,720 | * | 2/1996 | Smith | 428/57 |
| 5,543,011 | * | 8/1996 | Smith | 156/308.4 |
| 5,692,935 | * | 12/1997 | Smith | 442/38 |

* cited by examiner

Primary Examiner—Jeff H. Aftergut
Assistant Examiner—Gladys Piazza
(74) Attorney, Agent, or Firm—John Lezdey & Assoc

(57) ABSTRACT

The invention provides a process, and product thereof, for forming a chemically resistant fusion bonded between chemically dissimilar materials by use of an acid-based terpolymer for protective garments. The olefin terpolymers are preferably copolymers of an olefin, an acid and an ester. The process involves placing the olefin terpolymer film between two dissimilar films such as a facepiece and the fabric material of the garments and applying heat and pressure. The resulting fusion bonded film composite is strong, flexible and upon the application of sufficient stress exhibits total cohesive rupture failure.

8 Claims, 2 Drawing Sheets

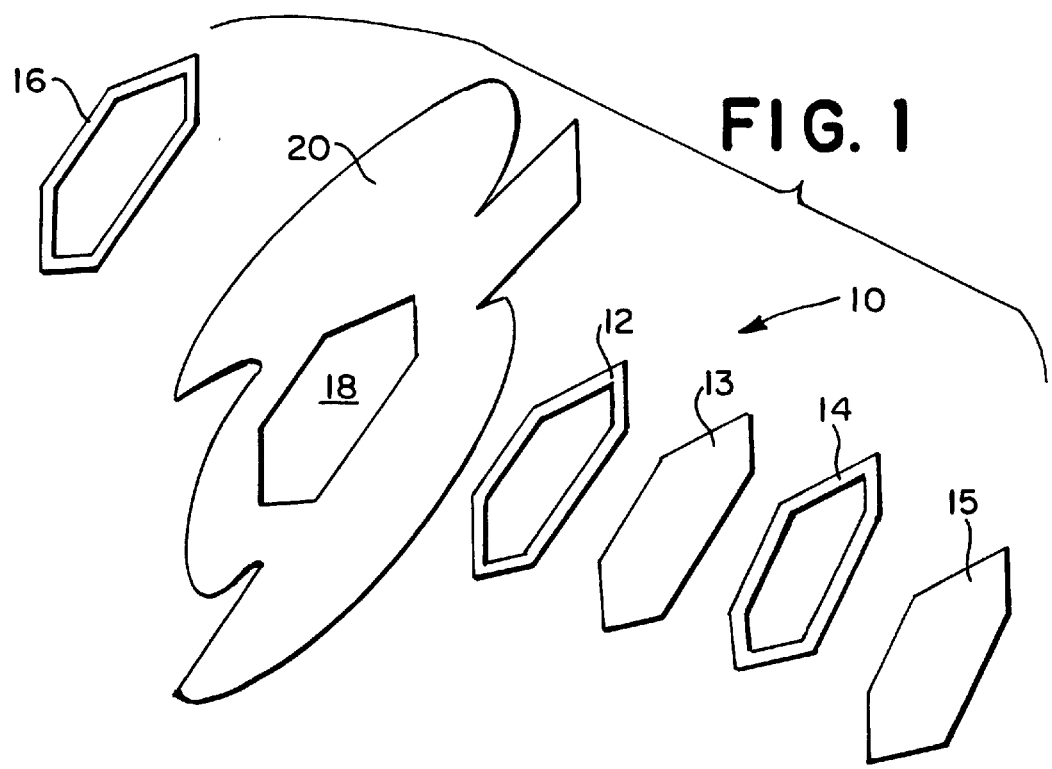
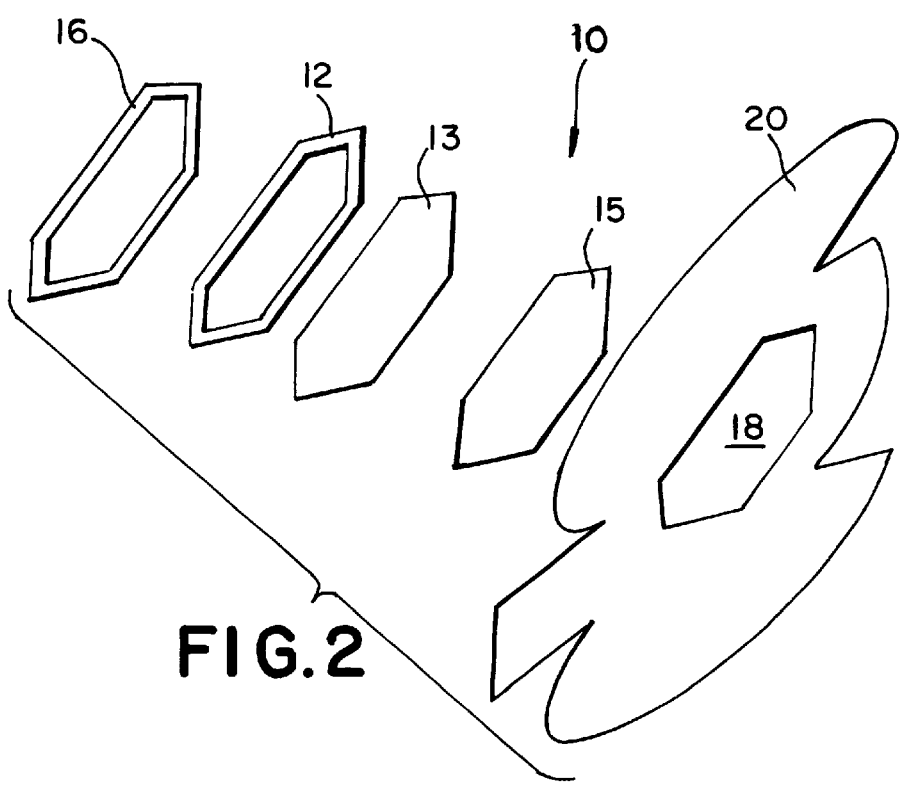

HAZARDOUS ENVIRONMENT PROTECTIVE GARMENTS HAVING A FUSION BONDED OPTICALLY TRANSPARENT FACEPIECE WITH OLEFIN TERPOLYMER SEAMS

BACKGROUND OF INVENTION

1. Field of the Invention

The present invention relates to protective garments. More particularly, the present invention relates to protective garments used in hazardous environments.

2. Description of the Prior Art

Protective clothing of many types are well known for many and varied uses including protection from fire, chemical liquids and vapors and other harmful substances Such clothing is often seen in suits for industrial workers, firemen, hazardous waste workers, chemical workers, race car drivers, airplane pilots and military personnel. Garments include not only complete hermetic suits, but also individual components such as trousers, jackets, gloves, boots, hats, head coverings, masks, etc.

Regulations restricting exposure to hazardous environments of various kinds, such as those contained in the Occupational Safety and Health Act, (OSHA) make it increasingly necessary to have better and more effective kinds of protective clothing. In particular, certain requirements by the U.S. Coast Guard and related requirements by other U.S. government agencies such as the Environmental Protection Agency (EPA) involve a total protective hermetic suit or unitary enclosures around the individual person to protect the worker from the widest possible range of hazardous materials.

Protective garments include woven and non-woven fabrics for disposable use. These garments are generally formed from various polymeric films or laminated plastic materials which are intrinsically resistant to dust or liquid penetration and in some cases impervious to chemical vapor penetration. The fabrics are generally spunbonded, meltspun or of non-woven thermoplastic material. The gas-tight suits must meet the permeation criterion of ASTM, test method D 739-85 and the liquid barrier suits must meet the penetration criterion of ASTM, test method F 903-84.

Encapsulated suits are required for "immediately dangerous to life and health" (IDLH) environments. These suits must be air tight and worn with a self-contained breathing apparatus (SCUBA). These are termed "HAZ MAT" suits and are designated as Level A suits under OSHA/EPA guidelines. These suits must be nonabsorbent, totally impermeable and resistant to a widest range of chemicals and reagents in liquid and/or gaseous forms. They should be fire resistant, meeting all the fabric requirements of the National Firefighters Protection Association, NFPA 1993. They should also be anti-static, meeting the fabric requirements of Anti-Static Charge Dissipation Test NFPA-99. Since these suits are worn by active individuals, they should be flexible, abrasion resistant, lightweight, and should maintain their impermeability while being used.

The garments presently available are almost invariably of thick construction and heavy in weight, and are often fabricated at least in part from materials impermeable to water or water vapor, such as natural and synthetic rubbers and elastomers, chlorinated rubbers, etc.

It is desirable to utilize an impermeable fabric which has a low melting point so as to have the ability to provide melt fusion bonding and which is chemically inert to a wide range of substances. The various fabric panels of the protective garment are usually overlapped and then sewn together. However, sewn seams cause needle holes which provide penetration sites by dust, liquids or vapors through the holes or the seams themselves and must be sealed by capping over them by adhesively bonding a suitable chemical resistant strip. Seams which are made with adhesives (hot melt or pressure sensitive) can peel apart upon flexing and kinking also can weaken the seam. The protective film or laminated plastic fabric seams must be fusion bonded sealed to form a barrier against solids (dust), gases and liquids while subjected to flexing and kinking in order to prevent toxic or harmful gases and liquids from permeating or penetrating the seams of the protective suit.

The optimum seam, which joins the various panels of laminated fabric or film to form a protective barrier against chemical vapors, should provide equal to or better impermeability than the laminated fabric against chemical vapors. Therefore, it is preferable to have a laminated fabric or film which melts to itself so that a tape of a plastic material having a melt index in the same range as the plastic barrier films can be used to fusion bond and form the seam. Fusion bonded in this manner, the seams of the laminated fabric or film provides excellent protection from contaminating dust, liquid and vapors.

When fabricating and bonding protective garments made from various plastic films and laminated plastic materials, the most difficult sealing problem is the bonding at stressed locations such as the zipper strip and the optically clear facepiece material to the plastic material which forms the protective barrier material for the garment.

A chemically resistant optically transparent facemask and a zipper for opening and closing the suit must be sealed to the protective plastic film in a gas tight seal. The gas-tight commercial zippers available are usually found on strips of polyvinyl chloride (PVC), polyethylene (PE), butyl rubber or neoprene rubber. The optically transparent facepiece material is generally made from PVC, TEFLON®FEP (fluorinated ethylene-propylene copolymer), TEFLON®PFA (perfluoroalkoxy resin) or polycarbonate. The surface of the protective film or laminated film to which the facepiece to be bonded is usually a polyolefin, a butyl rubber, neoprene, TEFLON®, a polyester, an aluminized polyester, a polyurethane or a polyvinyl chloride.

The fluorocarbon polymers have excellent properties regarding heat, chemical resistance and optical clarity and are the preferred materials for the facepiece component. However, the poor surface energy of the fluorocarbon resin films results in poor adhesiveness. This property becomes a difficult problem particularly in adhering dissimilar materials used in the manufacture of protective garments. Obviously, the facepiece is a critical component of a protective garment suit. A suitable manner of attachment to the protective garment fabric has been a recurring problem both from the standpoint of manufacture and in providing the required rupture resistant and chemically impermeable seam at the attachment.

It is very difficult to form flexible gas tight seals or bonds between many dissimilar materials such as fluorocarbon and halocarbon polymers, rubbers, polyolefins, plasticized polyvinyl chloride, neoprene, butyl rubber, silicones, polyester, etc. An adhesive or bonding system is needed which can form strong, flexible, gas tight seals or bonds between chemically dissimilar materials particularly for a fluorinated ethylene-propylene copolymers and perfluoroalkoxy resins laminated to polyethylene, polypropylene, and/or PVC. The conventional adhesives used to bond such dissimilar materials particularly for a fluorinated ethylene/propylene copolymers and materials have the disadvantages of forming brittle bonds that crack on flexing or develop leaks due to differences in the coefficient of thermal expansion between the two sheets of material that are sealed together. Pressure sensitive adhesives such as atactic polypropylene, some low molecular weight thermoplastic polyesters and acrylates either do not form a strong bond to the dissimilar materials and begin to leak after flexing and/or kinking. Standard hot melt adhesives depend on mechanical locking of the fibers on the surface of the fabric and upon stress surface rupture (unitary film failure) occurs.

There is a difference between bonds that are heat sealed and bonds that are heat fused. A heat sealed bond involves the transformation of a solid material (hot melt adhesive) to a semi-liquid sticky state that flows and wets the surfaces, and which upon cooling, seals the dissimilar materials. Fusion bonding involves intermixing or alloying of molten resin under heat and pressure between at least two chemically dissimilar surfaces to be bonded. The flowing and intermixing causes at least the two dissimilar materials to yield a product with superior adhesive strength and sealing characteristics exhibiting total adhesive failure. Materials having the same chemical composition when subjected to heat fusion bonding will exhibit total cohesive failure.

The problems associated with the attachment of the facepiece involves the poor adhesion properties of the fluorocarbon per se along with the use of dissimilar materials as fabrics in the manufacture of protective garments.

U.S. Pat. No. 4,272,851 issued to Goldstein, which is herewith incorporated by reference, discloses a protective garment for use in hazardous environments. The body of the garment is formed of a non-woven spun bonded olefin having a polyethylene film laminated to one side (Tyvek®). The patent discloses a transparent front visor (not further identified as to the material used) sealed to an integral hood made of Tyvek®, a seam-bondable material. It is not specifically disclosed how the sealing of the facepiece is effected although the other seams are ultrasonically welded. This procedure results in a seam which has inadequate resistance to rupture from shearing. In order to give greater strength against shear stresses, the patent further discloses adding a binding along the folded back seam, which binding is sewed on by traditional stitching means. While the multiple layers so stitched may be somewhat more protective of the body material, the facepiece does not undergo this step and remains subject to rupture. (See FIG. 6 of the patent). Further, the patent does not disclose the use of optically transparent halocarbon, particularly fluorocarbon plastics, more specifically, a fluorinated ethylene-propylene copolymer (FEP) or a perfluoroalkoxy resin (PFA) as a face visor. Polyvinyl chloride may be included to provide rigidity to the facepiece.

Therefore, there exists a need to fusion bond and seal chemically dissimilar materials so that the resulting bond is strong, flexible, impermeable to gases and liquids and when the bond fails from a sufficient of stress, the bond exhibits total cohesive failure. Such a bond and seal is necessary for affixing an optically transparent facepiece to a protective garment.

SUMMARY OF THE INVENTION

In accordance with the present invention, a process and a product thereof is provided for forming a chemically resistant and a gaseous and liquid impermeable seal between chemically dissimilar materials such as an optically clear plastic facepiece and a protective garment.

The optically transparent plastic facepiece can be formed of polyvinyl chloride or an ethylene-vinyl alcohol copolymer, nylon, polyester, polycarbonate or an ionomer which is inert to chemical attack. Preferably, perfluoroalkoxy resin (PFA) or a fluorinated ethylene-propylene copolymer resin films are used. Most preferably, the fluorocarbon polymer films are used in combination with a polyvinyl chloride (PVC) polymer film. The PVC polymer provides rigidity and fire retardancy to the facepiece.

The surfaces of fluorocarbon plastics which are used as facepieces for protective garments do not normally permit bonding and must be subjected to an etch treatment. The fluorocarbon resin is etched at the contacting edge with an etchant selected from sodium-liquid ammonia solution, sodium-naphthalene/tetrahydrofuran or sodium naphthalene/ethylene glycol dimethyl ether complex.

Solid, liquid and gas resistant fabric materials which are employed for protective garments include chemical protective clothing, gloves, boots, containers, inter alia. Such fabric material comprises at least one layer of a plastic laminate formed by coextruding at least two layers of a thermoplastic polymer such as a low melting low linear low density polyethylene resin intermediate layer of a polar resin or a hydrophilic and an adhering to the combined layer a fabric scrim comprising a blend of polyester and cellulosic fibers which preferably is treated with a fire resistant and anti-static agent. Preferably, the polyethylene has a softening point of about 250°–350° F.

In accordance with this invention, the fabric material is manufactured into protective garments by fusion bonding the edges of a pair of panels of the fabric material. Thus, forming the body elements of a protective garment so as to provide a reduction or elimination of sewn seams. The seam is formed by the laminates overlapping or being in abutment. Preferably, an olefin terpolymer as described below is used to produce under simultaneous heat and pressure a chemically resistant fusion bonded seal between the panels of the fabric materials having dissimilar films such as in the facepiece and zipper components.

In order to give greater strength against shear stresses, the seam is preferably reinforced by traditional stitching means. A tape of similar plastics material is applied directly and continuously over the stitched seam and then fusion bonded.

A method is provided for forming and seam sealing a plastic facepiece onto the hood of a protective garment such as a unitary over garment manufactured from the laminated fabrics described above.

The method comprises the steps of:

applying a film consisting of an olefin terpolymer along the edges of an optically transparent plastic film suitable for use as a facepiece;

positioning the facepiece to contact the laminated fabric surrounding a cutout in the hood of the garment sized to accommodate the facepiece; and then heating and applying pressure to form a fusion bond between the facepiece and the laminated fabric;

wherein the olefin terpolymer comprises (a) about 60 to 90 weight percent ethylene (b) about 0.2 to 25 weight percent of an ethylenically unsaturated acid or anhydride, and (c) about 0.1 to 10 weight percent of an ethylenically unsaturated ester; the olefin terpolymer having a melting point less than 220° F. and an acid number between about 10 to 60 milligrams KOH/gram of polymer.

Advantageously, the facepiece is formed in two layers wherein each layer is a different film.

It is an object of the invention to provide a hazardous environment protective garment or article of clothing having seams formed by fusion bonding.

It is another object of the invention to provide a protective garment manufactured from a bonding material of an olefin terpolymer capable of fusion bonding dissimilar materials which greatly increases the strength and impermeability of the resulting seam and yet is economically feasible.

It is yet another object of the invention to provide a protective garment with an optically transparent facepiece which is fusion bonded to the laminated fabric construction of the garment and is resistant to cohesive failure and resistant to a wide range chemical vapors and liquids.

It is a further object of the invention to provide liquid and vapor impermeable and chemically resistant seams using an olefin terpolymer fusion bonding material.

Other objects and a fuller understanding of the invention will be had by referring to the following description and claims taken in conjunction with the accompanying drawings.

BRIEF DESCRIPTION OF THE DRAWINGS

FIG. 1 is an exploded view of the facepiece construction of the invention showing component assembly from the inside of the protective garment.

FIG. 2 is an exploded view of another embodiment of the facepiece construction of the invention showing component assembly from the outside of the protective garment.

DESCRIPTION OF THE PREFERRED EMBODIMENTS

Figure 3:
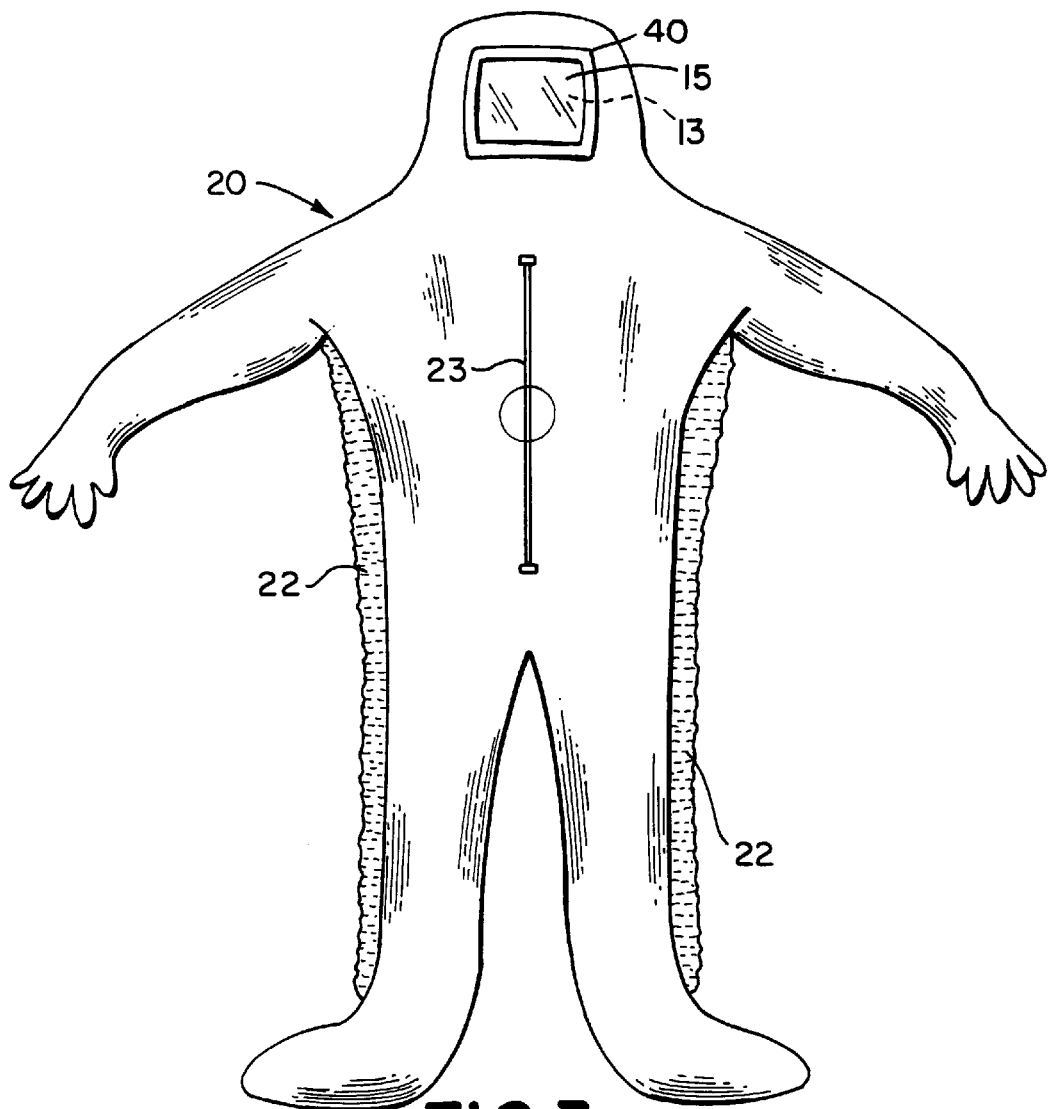
FIG. 3 shows a protective garment with the facepiece sealed according to this invention.

As shown in FIG. 1, there is provided one embodiment of the present invention of the facepiece assembly 10 comprising seam tape 16 consisting of the olefin terpolymer described in more detail below. The tape 16 is positioned outside of the hood portion of protective garment 20. Preferably, it is colored to match the color of the protective garment 20. The inside construction involves gasket material 12, an optically transparent polyvinyl chloride film 15. The fluorocarbon is preferably a TEFLON® polymer such as FEP or PFA used in a thin film of about 10 mils. The polyvinyl chloride component is formed from films of about 40 mils. The olefin terpolymer seam tapes 16 and 14 may be from about 10 to 40 mils thick. The polyvinyl chloride polymer provides rigidity and fire retardancy to the facepiece assembly. After the above-identified components are positioned as illustrated in FIGS. 1 and 2 within the hood portion cutout 18, they are subjected to a fusion bonding process discussed herein below.

Alternatively FIG. 2 shows another aspect of the facepiece assembly 10 comprising the components positioned on the outside of the hood of the protective garment 20. This embodiment eliminates the seam tape 14 without any detriment to the facepiece assembly.

As illustrated in FIG. 3, a protective garment 20 is prepared from a fabric comprising films with an outer layer of low-density polyethylene. The garment 20 is provided with an optically transparent facepiece assembly 10 and a zipper strip 23. The zipper strip 23 can be formed from thick films of polyvinyl chloride or an ethylene-vinyl alcohol copolymer layer similar to the film used in the interior of the garment 20. The optical transparent component of the facepiece 10 can also comprise a barrier film such as a TEFLON® (PFA, FEP), nylon polyester, or an ionomer, which is optically transparent and inert to many chemicals. Preferably, perfluoroalkoxy resin (PFA) or fluorinated ethylene polyethylene copolymer (FEP) is used. Suitable ionomers are described in U.S. Pat. No. 4,799,436, which is herein incorporated by reference.

The garment 20 is sealed with strips of the olefin terpolymer bonding material 12 or low-density polyethylene along the seams, facepiece 10 and zipper strip 23. Embossment 22 of the strip 21 provides flexibility and strength to the seams.

The entire protective garment 20 can be embossed to minimize wrinkling of the suit as well as to provide enhanced flexibility and strength.

Figure 4:
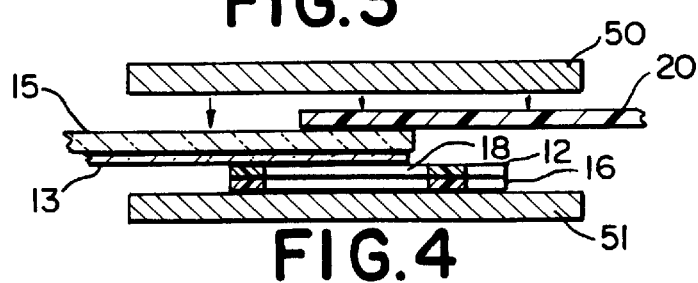
FIG. 4 is an enlarged cross-sectional view showing the method of forming a seam according to the facepiece construction of FIG. 2 of the present invention.

FIG. 4 is an enlarged cross-sectional view showing the assembly of the facepiece construction of FIG. 2. A heating element (not shown) is located within platen 50, which is designed to provide the necessary heat and pressure for fusion bonding. It is preferable that the other platen 51 also be provided with a heating element such as a band or wire.

As illustrated in FIG. 4, a method is provided for fusion bonding an optically transparent plastic facepiece on to the body of a protective garment wherein said garment consists of dissimilar flexible film material comprising the steps of:

applying an olefin terpolymer film 12 as a gasket material along the etched edges 18[1] of an optically transparent plastic film suitable for use as a facepiece assembly 10, consisting of fluorocarbon polymer film 13 of about 10 mils thickness and polyvinyl chloride film 14 of about 40 mils thickness, placing the facepiece assembly 10 carrying gasketing material in contact with the opening (not shown) of the hood portion of protective garment 20 between platens 50 and 51. Preferably, both platens contain heating elements to provide heat to effect melting of all the components. Sufficient pressure is applied either simultaneously or sequentially to provide a fusion bonding of the materials to yield a mechanically strong and chemically impervious seam long the edges of the facepiece assembly 10.

Optionally, a capping over the gasket material 12 with another strip 16 of the same olefin terpolymer material is preferable. Especially, if the method includes a sewing step. It is also preferred that strip 16 is the same color as the protective garment.

Figure 5:
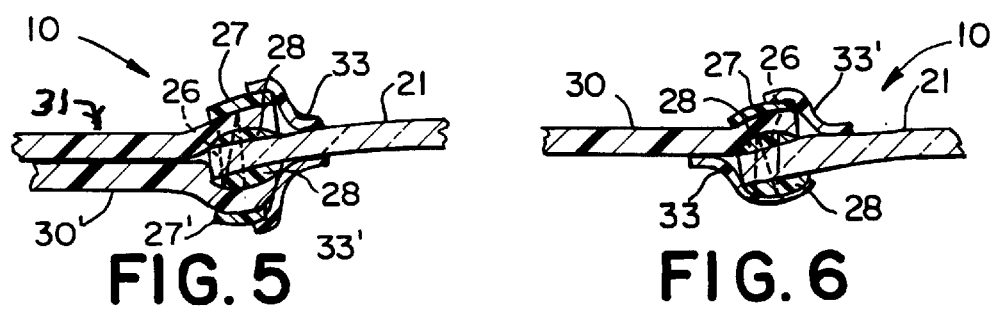
FIG. 5 is an enlarged cross-sectional view of the seam sealing zipper construction.

FIG. 5 illustrates a method of seam sealing of zippers with dissimilar materials such as polyvinyl chloride or butyl rubber or neoprene. The fabric layers 30 and 30[1], which consist of the same structure as the dissimilar flexible film material of the protective garment of the FIG. 3 are cut out and sandwich an intermediate fabric 21 along its edges. A gasketing compound 28, preferably the olefin terpolymer as described herein is provided. A thread 26, preferably a high tensile fiber, is sewn through the layers 30 and 30[1] and fabric 21. The layers 30 and 30[1] are fusion bonded together along the edges of the fabric 21. The threaded area is then capped so as to prevent any vapors from penetrating through pinholes that may exist and to further strengthen the area. This may be done from one or both sides. A suitable method of capping utilizes a strip of a chemical resistant material such as the olefin terpolymer described herein. The strips can be heat fused over the area. Heat fusible strips 33 and 33¹ that are compatible with the material used for the facepiece seal the edges along the fabric 20.

Figure 6:
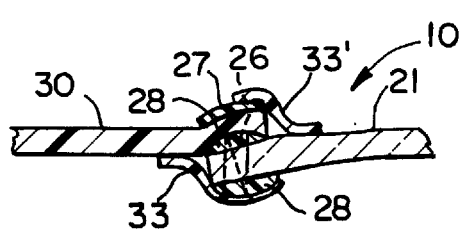
FIG. 6 is another embodiment showing an enlarged cross-sectional view of the seam sealing zipper construction.

Alternatively in FIG. 6, the fusion bonded laminated fabric seam is placed only on one side the dissimilar materials layer. The olefin terpolymer 28¹ is placed between the sewn seam. The outer seam holes are also capped with an olefin terpolymer film 27. The inside holes are fusion bonded with a compatible tape, such as FEP or PFA sealing tape for an FEP or PFA window. In those cases where a heat sealable tape is not available, then a hot melt tape is sealed over the seams. Optionally, an FEP pressure sensitive tape 33 and 33¹ can be applied over the back seam holes and along the edges where the two layers overlap 33 and 33¹.

The thickness of the polyethylene films is generally in the range of about 0.8 to 10 mils. The total thickness of the garment fabric 20 is generally about 10–30 mils. The ethylene-vinyl alcohol copolymer preferably contains about 20 to 70% vinyl alcohol, although, it can also contain ionomer residues.

The ethylene-vinyl alcohol copolymer layers in the coextrusion films or laminates range in thickness from about 0.1 to 2.0 mils and can comprise one or more layers. The overall thickness of these co-extruded films is preferably about 2 to 10 mils depending upon the ultimate use. Generally, the other resin layers are polyethylene, nylon or SURLYN (ionomer) in addition to the ethylene-vinyl alcohol copolymer layer.

The olefin terpolymers utilized in the present invention are flexible, tough and readily melt processable. Furthermore, these terpolymers adhere to a diverse spectrum of materials and provide strong bonds that exhibit total cohesive failure when stress is applied. Preferably, the olefin terpolymer film comprises from about 60 to 90 weight percent olefin monomers; from about 0.2 to 25 weight percent of an ethylenically unsaturated acid, such as acrylic acid, methacrylic acid, maleic acid or maleic anhydride and about 0.1 to 10 weight percent of an ethylenically unsaturated ester such as methyl acrylate, methyl methacrylate, vinyl acetate and alkyl acetate. The acids and anhydrides act similarly under these conditions so the anhydrides are grouped as acids for purposes of this patent disclosure.

The olefin terpolymers should be low melting, for example, having a softening point less than 200° F. and a melting point less than 220° F. This is advantageous for economic heating during the fusion bonding process and also for preserving the film integrity of the other film layers in the garment composite. The acid number of the olefin terpolymer should be between about ten (10) and sixty (60) milligrams KOH/gram of polymer.

The olefin terpolymers useful according to this invention are disclosed in U.S. Pat. No. 3,201,374 to Simms and U.S. Pat. No. 3,215,678 to Adelman and are herewith incorporated by reference.

Optionally, the olefin terpolymer film may be put through a corona discharge if an anti-static product is desired. Alternatively, an anti-static additive may be added to give the same effect.

One embodiment of the present invention as shown in FIG. 4 places a olefin terpolymer between two chemically dissimilar films and subjects the film composite to heat and pressure simultaneously until fusion bonding produces a bond which only fails by total cohesive failure. One of the chemically dissimilar films may be selected from the group of polyethylene, butyl rubber, chemically treated fluorinated ethylene-propylene resin and perfluoroalkoxy resin. The other chemically dissimilar film may be selected from the group of polyvinyl chloride, neoprene, chemically treated polytetrafluoroethylene and derivatives thereof.

The applied pressure for fusion bonding advantageously ranges between three and twenty pounds per square inch. The processing melt fusion temperature is preferably between 200° F. and 350° F. to melt flow the film composite. The dwell period fusion for complete bonding usually takes less than an half-hour and can sometimes be done within five minutes.

To assist adhering the films together, a polyurethane coating may be applied to the dissimilar films before they are fusion bonded. This is especially advantageous for the polyvinyl chloride, neoprene, butyl rubber and polytetrafluoroethylene type films.

Optionally, the film composites may be sewn together for added strength before applying the heat and pressure. Alternatively, a scrim may be attached to the film composite for added strength.

The fabric material used in the invention may comprise a polymeric material which is a single layer or multi-layered construction, as desired. They are generally thermoplastic non-woven fabrics such as spunbonded polyester, meltspun polyester, hydroentangled polyester, and the like. Illustrative of the polymer material are polyolefins such as polyethylene, polypropylene, other polymers derived from ethylenically unsaturated monomers including vinyl alcohol, vinyl chloride, vinylidene chloride, and the like. In addition, polyesters, nylon or mixed fibrous webs may be used. Most preferred are web panels comprising TYVEK®, a spunbonded non-woven polyethylene web (E.I. DuPont de Nemours & Company, Inc. Wilmington, Del.).

Alternatively, the web panels or garments of the present invention may be of laminated form, comprising a plurality of associated layers of materials such as those previously described with respect to mono-layer panels. In such laminates, the respective layers may be coextruded or otherwise conformed, or those layers may be joined to one another subsequent to their initial formation, as for example by elevated temperature interpenetration, chemical reactions between functional groups on opposing faces in the laminate, etc. A particularly preferred laminate for the present invention comprises TYVEK® laminated or coated with one or more layers of polyethylene homopolymer, ethylene/vinyl acetate copolymer, ethylene/vinyl alcohol copolymer and vinylidene chloride/vinyl chloride copolymer.

Liquid penetration resistant tapes may be placed over the seams to provide additional strength and to prevent pinholes at the seams. The tape may be formed similarly of any suitable material which is satisfactory to provide the desired liquid penetration to the seam assembly. The tape is suitably a mono-layer or a laminate material formed of materials such as polyolefins, polymers derived from other ethylenically unsaturated monomers, laminates thereof, etc.

More generally, the tape closure may be affixed to the second side of the adjacently adjoined panels shown in FIG. 3 in any suitable manner such as by elevated temperature interpenetration, chemical bonding, adhesive bonding, etc.

In the neck region of the garment, the body portion may be joined to a hood. The hood has a frontal piece of suitable transparent material such as MYLAR®, polycarbonate, etc. Preferably, TEFLON® (FEP) or PFA in combination with PVC.

U.S. Pat. Nos. 5,082,721, 5,491,022, 5,494,720, 5,543,011 and 5,692,935 which are incorporated by reference disclose fabric materials for use in manufacturing protective garments that can be used in the present invention.

A number of examples using these low melting olefin terpolymer thermoplastic materials containing hydrogen bonding (polar) co-monomers are given along with the procedure. All bonds appear to fail by total cohesive failure.

Examples 1–5 follow the same general procedure. Once the films are assembled together as shown in FIGS. 1 and 2, the resulting film composite is placed under pressure varying from three to twenty pounds per square inch, while simultaneously being heated at a temperature ranging from 200° F. to 350° F. The film composite is held under these conditions for a dwell time ranging from five to twenty-five minutes. The film composite is then removed from these conditions and the process is complete.

Example 6 particularly describes optimum procedural conditions for one embodiment of the present invention.

EXAMPLE 1

One film having a polyethylene surface is placed on top of a solvent-cleaned olefin terpolymer layer with an approximate thickness ranging from twenty to forty mils. A solvent-cleaned PVC film (such as a zipper segment) is placed beneath the olefin terpolymer layer, and a polyurethane coating is optionally applied to the PVC film before placement. Once completed, the film composite may optionally be sewn together or sewn to a scrim.

EXAMPLE 2

One film having a polyethylene surface is placed on top of a solvent-cleaned olefin terpolymer layer with an approximate thickness ranging from twenty to forty mils. A chemically treated Tetra-etch® (sodium-naphthalene/ethylene dimethyl esther complex) optically transparent TEFLON® (FEP) film is placed beneath the olefin terpolymer layer, and a polyurethane coating is optionally applied to the Teflon film before placement. Once completed, the film composite may optionally be sewn together or sewn to a scrim. Tetra-etch® is a sodium naphthalene/ethylene glycol dimethyl ether complex marketed by W.L. Gore & Associates, Inc., Flagstaff, Arizona.

EXAMPLE 3

One film having a chemically treated (Tetra-etch®) TEFLON® (PFA) surface is placed on top of a solvent-cleaned olefin terpolymer layer with an approximate thickness ranging from twenty to forty mils. A solvent-cleaned neoprene film (such as a zipper segment) is placed beneath the olefin terpolymer layer, and a polyurethane coating may optionally be applied to both the polytetrafluoroethylene and neoprene films before placement. Once completed, the film composite may optionally be sewn together or sewn to a scrim.

EXAMPLE 4

One film having a butyl rubber surface is solvent-cleaned and placed on top of a solvent-cleaned olefin terpolymer layer with an approximate thickness ranging from twenty to forty mils. A solvent-cleaned neoprene film (such as a zipper segment) is placed beneath the ABT layer, and a polyurethane coating may optionally be applied to both the butyl rubber and neoprene films before placement. Once completed, the film composite may optionally be sewn together or sewn to a scrim.

EXAMPLE 5

One film having a butyl rubber surface is solvent-cleaned and placed on top of a solvent-cleaned layer with an approximate thickness ranging from twenty to forty mils. A chemically treated (Tetra-etch®) TEFLON® (FEP) film is placed beneath the olefin terpolymer layer. Once completed, the film composite may optionally be sewn together or sewn to a scrim.

EXAMPLE 6

One film having a butyl rubber surface is solvent-cleaned and placed on top of a solvent-cleaned olefin terpolymer layer with an approximate thickness ranging from twenty to forty mils. A chemically treated (Tetra-etch®) TEFLON® (FEP) film is placed beneath the olefin terpolymer layer, and a polyurethane coating is applied to both the butyl rubber and TEFLON® (FEP) film before replacement. Once completed, the film composite may optionally be sewn together or sewn to a scrim.

The film composite is placed under pressure of twenty pounds per square inch, and heated at a temperature of 250° F. The composite is kept under these conditions for about twenty-five minutes. The film composite is then removed from these conditions, and the process is complete.

Although the invention has been described with preferred embodiments, it is understood that variations and modifications may be employed without departing from the concept of the invention as defined in the following claims.

What is claimed is:

1. a process for bonding an optically transparent plastic facepiece onto a protective garment fabric material wherein said garment fabric material and said facepiece each consists of flexible material, which is chemically dissimilar from each other, comprising the steps of:

a. Applying an olefin terpolymer strip comprising from about 60 to 90 weight percent olefin monomers, from about 0.2 to 2.5 weight percent of an ethylenically unsaturated acid selected from the group consisting of acrylic acid, methacrylic acid, maleic acid and maleic anhydride, and about 0.1 to 10 weight percent of an ester selected from the group consisting of methyl acrylate, methylmethacrylate, vinyl acetate, and alkyl acetate along edges of a first side of said facepiece;

b. Placing said garment fabric material which consists of a spun bonded non-woven polyethylene web laminated or coated with at least one layer of a member selected from the group consisting of ethylene/vinyl acetate copolymer, ethylene/vinyl alcohol co-polymer, polyethylene homopolymer and vinylidene chloride, vinyl chloride co-polymer in contact with a second side of said facepiece, where said second side is opposite from said first side, and then, c. Heating the composite formed by steps a and b to an effective temperature to cause said garment fabric material to flow about said edges of said facepiece to form a fusion bond seam, and then placing the composite under pressure for a dwell period until a chemically resistant liquid and gas impervious seal, which is free of adhesive failure is formed about said edges of said facepiece; and wherein said olefin terpolymer strip has a melting point less than 220° F.

2. The process of claim 1 wherein said facepiece comprises etched polytrafluoroethylene.

3. The process of claim 1 wherein said facepiece includes a polyurethane coating.

4. The process of claim 1 wherein the olefin terpolymer strip is about 10 to 40 mils thick.

5. The process of claim 1 wherein said olefin terpolymer strip is pretreated by corona discharge to produce an anti-static product.

6. The process of claim 1 wherein said olefin terpolymer strip is pretreated with anti-static additives to produce an anti-static product.

7. The process of claim 1 further comprising the step of adding an optically transparent halogenated polyolefin film for providing rigidity flame-resistance to the composite.

8. The process of claim 7 wherein the halogenated polyolefin film is polyvinyl chloride.

* * * * *